United States Patent
Andreasson

(10) Patent No.: US 7,930,007 B2
(45) Date of Patent: Apr. 19, 2011

(54) AUDIO OUTPUT DEVICE SELECTION FOR A PORTABLE ELECTRONIC DEVICE

(75) Inventor: Markus Andreasson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 995 days.

(21) Appl. No.: 11/556,446

(22) Filed: Nov. 3, 2006

(65) Prior Publication Data

US 2007/0281744 A1 Dec. 6, 2007

Related U.S. Application Data

(60) Provisional application No. 60/803,779, filed on Jun. 2, 2006.

(51) Int. Cl.
*H04M 1/00* (2006.01)

(52) U.S. Cl. .................. 455/575.2; 455/569.1; 455/567; 455/557; 379/428.02; 379/430; 379/433.01; 381/74; 381/309

(58) Field of Classification Search ............... 455/575.2, 455/569.1, 567, 554.1, 557, 90.3; 379/428.02, 379/430, 431, 433.01; 381/74, 309
See application file for complete search history.

(56) References Cited

U.S. PATENT DOCUMENTS

| | | | | |
|---|---|---|---|---|
| 4,621,372 A | * | 11/1986 | Relyea | 455/74 |
| 5,191,602 A | * | 3/1993 | Regen et al. | 455/575.2 |
| 6,301,490 B1 | * | 10/2001 | Callan | 455/575.2 |
| 6,745,054 B2 | * | 6/2004 | Fraccaroli | 455/567 |
| 7,433,715 B2 | * | 10/2008 | Buckley et al. | 455/569.1 |
| 2003/0144040 A1 | * | 7/2003 | Liu et al. | 455/568 |
| 2004/0042629 A1 | * | 3/2004 | Mellone et al. | 381/310 |
| 2004/0121796 A1 | | 6/2004 | Peng | |
| 2004/0136522 A1 | * | 7/2004 | Wurtz | 379/430 |
| 2004/0209658 A1 | * | 10/2004 | Liu et al. | 455/575.2 |
| 2004/0228476 A1 | | 11/2004 | Denninghoff | |
| 2006/0029234 A1 | | 2/2006 | Sargaison | |
| 2006/0165243 A1 | * | 7/2006 | Lee | 381/74 |
| 2007/0004473 A1 | * | 1/2007 | Clark et al. | 455/575.2 |

FOREIGN PATENT DOCUMENTS

| | | |
|---|---|---|
| DE | 100 18 306 A1 | 10/2001 |
| EP | 1 154 621 A1 | 11/2001 |
| GB | 2 277 422 A | 10/1994 |

OTHER PUBLICATIONS

International Search Report for corresponding PCT application No. PCT/EP2006/069119 with written opinion, dated Feb. 15, 2007, 10 pages.

* cited by examiner

*Primary Examiner* — Matthew D Anderson
*Assistant Examiner* — Shaima Q Aminzay
(74) *Attorney, Agent, or Firm* — Harrity & Harrity, LLP

(57) ABSTRACT

A portable electronic device can detect whether an output unit of an accessory is connected to the body of a user and determines audio output units to which its application will transmit audio signal. The portable electronic device comprises an interface connected to the accessory, an application handling unit and a control unit. The control unit determines if the accessory is attached to the body of a user, selects audio output units to be used for the electronic device and transmits audio signals to the selected audio output unit for the application.

23 Claims, 3 Drawing Sheets

CELLULAR PHONE

ACCESSORY

ACCESSORY SYSTEM CONNECTION

CONTROL UNIT

AUDIO OUTPUT DEVICE SELECTION FOR A PORTABLE ELECTRONIC DEVICE

RELATED APPLICATION

This application claims priority under 35 U.S.C. §119 based on U.S. Provisional Application No. 60/803,779, filed on Jun. 2, 2006 and titled "SOUND OUTPUT SELECTION IN RELATION TO AN ACCESSORY," the contents of which are hereby incorporated by reference.

TECHNICAL FIELD OF THE INVENTION

The present invention relates to the field of communication devices, such as cellular phones and associated devices, such as accessories to phones. More particularly, the present invention relates to selectively driving output units in phones or in accessories.

DESCRIPTION OF RELATED ART

Today's portable communication devices, such as cellular phones, are designed to operate in conjunction with other devices, known as accessories, such as portable hands-free devices. A portable hands free device may be connected to the phone through its electrical connector or through wireless short range communication interfaces, for instance, based on the Bluetooth™ technology. Such accessories may comprise a microphone and one or two ear phones and may provide a user the ability to engage in phone conversations, to listen to music and to engage in other activities without holding the phone.

In some portable electronic devices, audio signals may be outputted from its application to an accessory to notify or alert its user of events, such as the arrival of an incoming call to a cellular phone, the arrival of a message, or the occurrence of a scheduled event on a calendar. The audio signals may drive the audio output units (e.g., earphones) of the accessory whenever the accessory is connected to the phone. However, it is possible that the user is not listening to the earphones. One strategy that can be implemented to ensure that the audio output signal, in some form, reaches the user is to drive all audio output units that are connected to the phone. For example, the phone may be programmed to transmit audio signals to both earphones of the accessory as well as the speakers of the phone. Such strategy, however, wastes power. While it is possible to select audio output units and alert a user only if the accessory is connected, such selection scheme may still transmit audio output signals to the accessory even though the user is not using the earphones, which, again, wastes power and drains phone battery. In addition, if no audio output unit other than the earphones is driven, the user may miss incoming calls. This problem of driving wrong audio output units and wasting power exists not only in the context of alerting users of events (e.g., incoming calls), but may exist for any application that has audio outputs.

There is therefore is a need to provide an improved way of selecting and driving audio output units for an application of a portable electronic device.

SUMMARY OF THE INVENTION

The present invention is directed towards providing a more efficient way of selecting and driving an audio output unit for an application of a portable electronic device in relation to a connected accessory.

According to a first aspect, a method efficiently drives audio output devices for an application of a portable electronic device. The method comprises determining if an audio output unit of the accessory is attached to the body of a user, selecting the audio output unit when it is determined that the audio output unit is attached to the body, and transmitting an audio output signal to the selected audio output unit.

A second aspect includes the features of the first aspect, wherein, when it is determined that the audio output unit is attached to the body, no audio output unit in the portable electronic device is selected.

A third aspect includes the features of the first aspect, further comprising receiving an occurrence of an event in the portable electronic device, and transmitting a signal to the audio output unit to provide an alert of the occurrence of the event A fourth aspect includes the features of the third aspect, further comprising choosing a vibrator included in the portable electronic device for signalling the occurrence of the event when it is determined that the audio output unit is attached to the body.

A fifth aspect includes the features of the third aspect, wherein receiving the occurrence of the event includes receiving an incoming call.

A sixth aspect includes the features of the fifth aspect, further comprising automatically accepting the call after a predetermined number of alerting intervals when it is determined that the audio output unit is attached to the body.

A seventh aspect includes the features of the first aspect further comprising determining if the accessory is connected to the portable electronic device, wherein selecting the audio output unit is further based on determining if the accessory is connected to the portable electronic device.

An eighth aspect includes the features of the first aspect, wherein the portable electronic device includes a device audio output unit and the device audio output unit is selected when the audio output unit is determined not to be attached to the body.

A ninth aspect includes the features of the eighth aspect wherein the device audio output unit is in the portable electronic device.

According to a tenth aspect a portable electronic device provides an efficient way of driving audio output units for the device. The portable electronic device comprises an interface for connecting the portable electronic device to an accessory that includes a first output unit, and a control unit for performing a method including determining if the first output unit of the accessory is attached to the body of a user, selecting either the first audio output unit of the accessory or a second audio output unit of the portable electronic device, based on determining if the first audio output unit is attached to the body, and transmitting an audio output signal to the first set of audio output units.

An eleventh aspect includes the features of the tenth aspect wherein, when it is determined that the first audio output unit is attached to the body, no audio output unit in the portable electronic device is selected.

A twelfth aspect includes the features of the tenth aspect wherein the method further includes receiving an occurrence of an event in the portable electronic device and transmitting a signal to the first audio output unit to provide an alert of the occurrence of the event.

A thirteenth aspect includes the features of the twelfth aspect, further comprising a vibrator and wherein the method further comprises choosing the vibrator for signalling the occurrence of the event when it is determined that the first audio output unit is attached to the body.

A fourteenth aspect includes the features of the twelfth aspect, wherein receiving the occurrence of the event includes receiving an incoming call.

A fifteenth aspect includes the features of the fourteenth aspect, wherein the method further includes automatically accepting the call after a predetermined number of alerting intervals when it is determined that the first audio output is attached to the body.

A sixteenth aspect includes the features of the tenth aspect, wherein the method further includes determining if the accessory is connected to the portable electronic device, wherein selecting the first audio output unit is further based on determining if the accessory is connected to the portable electronic device.

A seventeenth aspect includes the features of tenth aspect, wherein the method selects the second audio output unit when the first audio output unit is not attached to the body.

An eighteenth aspect includes the features of tenth aspect, wherein the portable electronic device includes a portable communication device.

A nineteenth aspect includes the features of the tenth aspect wherein the portable electronic device includes a cellular phone.

According to a twentieth aspect, the portable electronic device provides an efficient way of driving audio output units for the device. The portable electronic device comprises means for determining if a first audio output unit in an accessory for the portable electronic device is attached to the body of a user, means for selecting an audio output unit, based on determining if the first audio output unit is attached to the body, and means for transmitting an audio output signal to the first audio output unit.

According to a twenty-first aspect, a computer program product provides machine executable method for efficiently driving audio output units. The method comprises determining if an audio output unit in an accessory for a portable electronic device is attached to the body of a user, selecting a first audio output unit, based on determining if the audio output unit is attached to the body, and transmitting an audio output signal to the audio output unit.

According to a twenty-second aspect, a method enables a portable electronic device to efficiently drive audio output units. The method comprises determining if an audio output unit in an accessory for a portable electronic device is attached to the body of a user, and transmitting a signal to the portable electronic device, based on determining if the audio output unit is attached to the body, the portable electronic device performing steps including, selecting at least a first audio output unit based on the signal and transmitting an audio output signal to the first audio output unit.

A twenty-third aspect includes the features of the twenty-second aspect, further comprising receiving the audio output signal and generating sound through the first audio output unit based on the audio output signal.

According to a twenty-seventh aspect, an accessory enables a portable electronic device to efficiently drive audio output units. The accessory comprises an interface for connecting the accessory to the portable electronic device, an audio output unit, and a sensor for detecting if the audio output unit is attached to the body of a user and for transmitting a signal that indicates whether the audio output unit is attached to the body, wherein the portable electronic device selects a first audio output unit based on the signal.

A twenty-fifth aspect includes the features of the twenty-fourth aspect, wherein the accessory includes a portable hands-free device.

The aspects cited above may allow audio signals to be output only to the accessory in case the user has an audio output unit attached to his or her body and, if the audio output unit is not attached, the signal may be redirected to the audio output units of the portable electronic device. The aspects may provide a more efficient selection of audio output units, may limit the disturbance of user environment, and may save battery power, as the audio signal is output to units that are in use.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
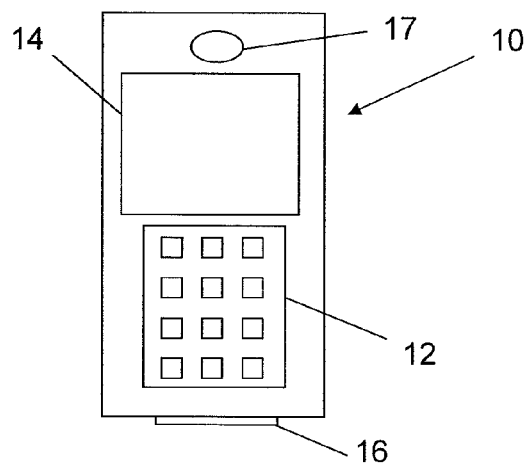
FIG. 1 schematically shows a front view of a cellular phone.

Implementations of the system described herein relate to an accessory for a portable electronic device, such as a portable communication device like a cellular phone, as well as to such portable electronic device. Such a phone 10 is schematically shown in a front view in FIG. 1. The phone 10 includes a display 14, which may be a liquid crystal display, a key pad 12 including a number of keys and an electrical interface in the form of a system connector 16 for connecting to an accessory. There is furthermore a phone audio output unit in the form of a speaker 17. The phone normally includes an antenna, provided in the interior of the phone 10. A cellular phone is just one example of a portable electronic device. A portable electronic device can also be things such as a lap top computer, a palm top computer, an electronic organizer, a smartphone, or a communicator.

Figure 2:
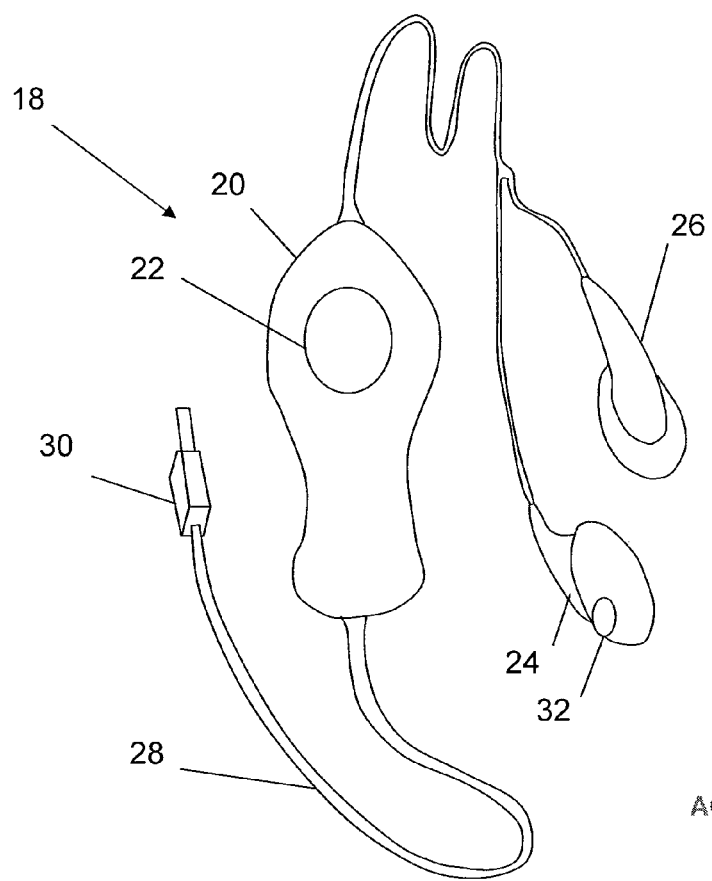
FIG. 2 schematically shows an accessory according to the present invention in the form of a hands-free device for connection to the phone of FIG. 1.

FIG. 2 schematically shows an accessory for a portable electronic device. The accessory in FIG. 2 is a portable hands-free device 18 which includes an electrical interface in the form of a plug 30, for inserting into the system connector of the phone and a cord 28 connected to a main body 20 including a microphone 22. The main body 20 is furthermore connected to a first and a second accessory audio output unit in the form of a first and a second earphone 24 and 26 via another cord. The microphone 22 may be connected to the system connector of the phone, similarly as the earphones 24 and 26. The first earphone 24 also includes a pressure receiving unit 32 that is part of a detector arranged to detect whether the earphone is attached to the body of the user. For example, earphone 24 may be attached to an ear.

Figure 3:
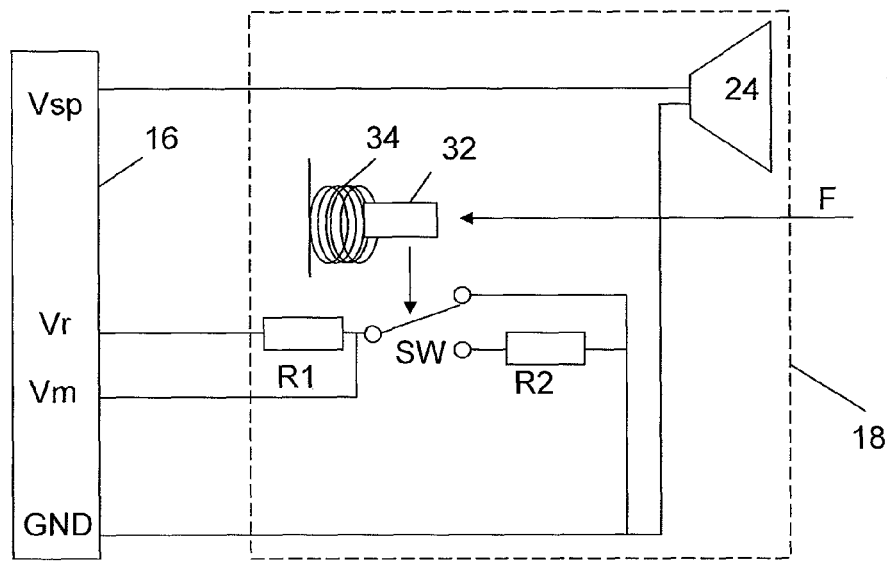
FIG. 3 schematically shows different elements of the hands-free device of FIG. 2 connected to a system connector of the phone of FIG. 1.

FIG. 3 schematically shows the different elements of the hands free device 18 connected to the system connector 16. The hands-free device 18 is here outlined in the form of a dashed box. For simplicity, only the first earphone 24 is shown in FIG. 3 as being connected to the system connector 16 for receiving an electrical audio signal Vsp. The second earphone may receive the same or another audio signal, where another audio signal may be provided if stereo sound is desired. In the hands-free device 18, the pressure receiving unit 32 is mechanically connected to an interior surface of the hands-free device 18 via a spring 34. The pressure receiving unit 32 can be moved by a force F, which may be provided when the earphone 26 is attached to an ear of a user. Force F displaces the pressure receiving unit 32, which may be in the form of a plastic or metallic pin. The displacement of the pressure receiving unit 32 in the direction of the spring 34 mechanically influences a switch SW provided in the accessory 18 to change its position. When force F is no longer applied, the pressure receiving unit 32 returns to its original position and causes the Switch SW to return to its original position. The switch SW has one input connected to a reference voltage Vr provided by the system connector 16 via a first resistor R1 and two outputs, the first directly connected to a ground potential GND that is provided by the system connector 16 and the second connected to a second resistor R2. A measured voltage Vm is provided to the system connector 16 from the connection point between input of the switch SW and the first resistor R1. When no force is applied, the switch SW interconnects its input with the first output and thus provides a ground potential GND as a measured voltage Vm. When force F is applied, the pressure receiving unit 32 actuates the switch so that it interconnects its input with the second output and provides a measured voltage Vm that is a between the voltage of the reference voltage Vr and ground GND. By a suitable selection of resistors, voltage Vm can be directly used in digital applications. In FIG. 2, the spring 34, the pressure receiving unit 32, the switch SW and the resistors R1 and R2 together form an electro-mechanical detector that is arranged to detect that the earphone 26 is plugged into or attached to the ear of the user.

Figure 4:
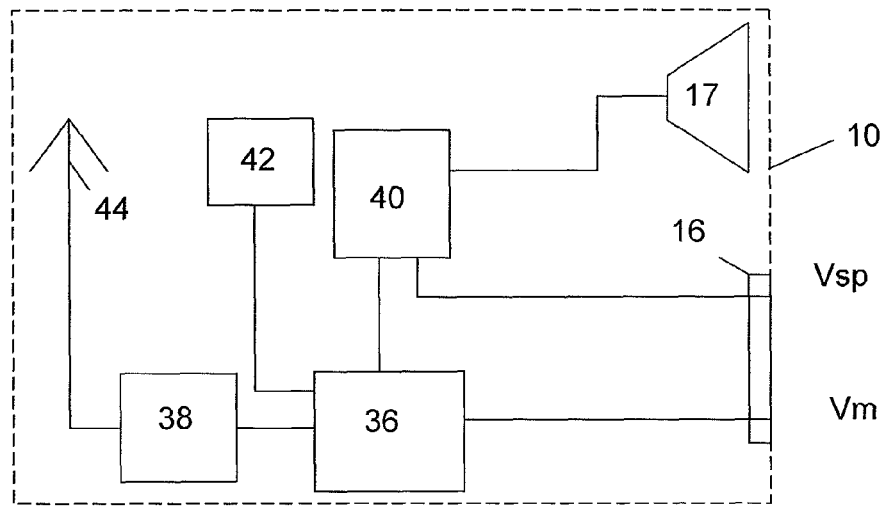
FIG. 4 shows a block schematic of units in the phone of FIG. 1 used for determining an audio output unit.

FIG. 4 shows a block schematic of different units in the phone that are relevant for the present invention. The phone 10, which is shown as a dashed box, includes an application handling unit 38, which, in the present example, handles an application that manages incoming and outgoing telephone calls. The application handling unit 38 also handles events occurring in the application. For this reason the application handling unit 38 is connected to an antenna 44. A control unit 36 is connected to the system connector 16 for receiving the measured voltage Vm, to a driving unit 40 for driving audio output units using the audio output signal Vsp, and to a vibrator 42. The driving unit 40 is connected to the phone speaker 17 as well as to the system interface 16 for providing the audio output signal Vsp. The driving unit 40 may have access to a number of alerting signals. These alerting signals may be set by the user of the phone to alert of the incoming calls. The user may for instance select one type of ring signal associated with a certain calling party according to a phone book setting. In the figure the ground GND and reference voltage Vr have been omitted for clarity. The voltages may furthermore be provided by other units of the phone, for instance in relation to the ordinary power supply circuits of the phone.

Figure 5:
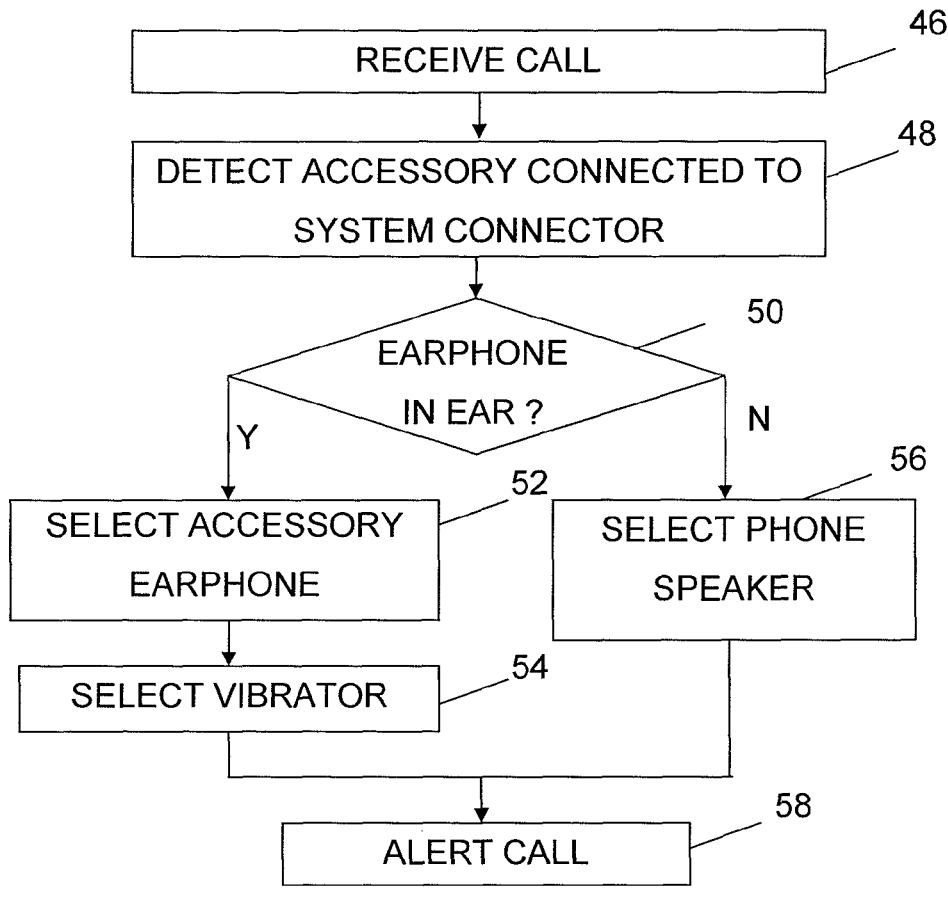
FIG. 5 shows a flow chart of method for selecting audio output units for an application within the phone of FIG. 1 and for driving audio output units, the method being performed in the phone of FIG. 1.

The operations of devices and components shown in FIGS. 1-4 will now be described with references to FIGS. 1-4, as well as with reference to FIG. 5, which shows a flow chart of a method for selecting audio output units for an application within a portable electronic device and for driving audio output units.

When an event occurs in the phone, for instance when a phone call is received by the application handling unit 38, in step 46, the control unit 36 is notified of this fact. The control unit 36 then determines that the hands-free device 18 is connected to system connector 16 of the phone 10, in step 48. This may be done through detecting that the plug 30 is inserted into the connector 16. A number of ways may be employed to detect this. For instance, it may be done through detecting a microphone being connected (not shown), through detecting that the earphone is electrically connected to the interface 16, or through using the measured voltage Vm. There are thus many ways in which the detection may be performed. If the hands-free device 18 is not connected, the control unit 36 uses the ordinary audio output units of the phone for alerting a user of the call.

When the control unit 36 has determined that the hands-free device 18 is connected to the system connector 16 of the phone 10, it investigates if the first earphone 24 is attached to the ear, in step 50. The investigation is performed through examining the measured voltage Vm. If the voltage is zero the first earphone 24 is not attached. If it has another value, the first earphone 24 is attached. If the first earphone is attached, in step 50, the control unit 36 selects at least one audio output unit in the accessory 18 to alert the unit of the call, in step 52. The only audio output units selected are those provided in the accessory, i.e. no audio output unit of the phone. The control unit 36 may also select another alerting unit of the phone, namely the vibrator 42, in step 54. Once the units have been selected, alerting is performed, in step 58, which is accomplished through the control unit 36 ordering the driving unit 40 to provide the audio signal Vsp to the earphones 24 and 26 via the system connector 16 and through activating the vibrator 42. The user can then accept the call.

If the control unit 36 has determined that the first earphone 24 is not attached to the ear, in step 50, it selects at least one audio output unit in the phone for alerting the unit of the call, in step 56. The only audio output units selected are those provided in the phone, (i.e. no audio output unit of the accessory). The control unit 36 thereafter orders the driving unit 40 to alert a user of the call, step 58, using the phone speaker 17, whereupon the user is free to accept the call.

Accordingly, whether audio output unit of the accessory is connected to the body of the user or not is accounted for when the portable device selects ways to alert the user of an event. In this way, an audio signal is outputted to the hands-free device if the user has the earphone attached to his/her body. If the earphone is not attached to the body, the audio output units of the phone are used. This process provides an efficient selection of audio output units and of limiting the disturbance to the environment whenever it is possible. This also saves battery power, since signal is output to units are in use. Should the accessory be used for other applications, their use will not be influenced by the selection of the audio output units in accordance with the present invention, unless their use involves sound or audio.

Figure 6:
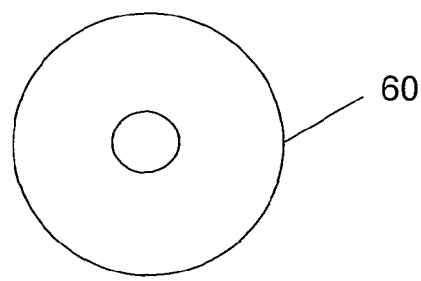
FIG. 6 schematically shows a computer program product in the form of a CD ROM disc comprising computer program product for implementing methods of described herein.

The control unit is preferably provided in the form of a microprocessor with corresponding program code for performing method steps. The application handling unit and driving unit also may be provided similarly. The program code for the control unit, the application handling unit or the driving unit can be provided on a data carrier such as a CD ROM 60 as shown in FIG. 6 or a memory stick. Alternatively, the program code may be provided on a server, from where it is downloaded to the portable electronic device. It is also possible to connect the interface in the portable electronic device directly to a computer (e.g., a personal computer), and download the program code into the phone from the computer.

The present invention can be varied in a number of ways in addition to those that have already been mentioned. It is possible, when the portable electronic device transmits an alerting signal for an incoming call after determining that an audio output unit of the accessory is attached to the body of the user, to have the call automatically accepted by the phone after a predetermined number of alerting intervals. This makes the process of receiving the call easier for the user. It is also possible to enable the user to decline the call, for instance, by providing a busy tone.

Naturally it is possible to provide a detector for the second earphone shown in FIG. 2. The detectors can then be used for selecting only the audio output units that are attached to the body. A user may for instance have only one audio output unit attached to his ear. Accordingly, of the two output units, only the audio unit attached to his ear may be supplied with the audio signal. Such configuration further saves power. The feature can also be used to determine if mono or stereo sound is to be used in alerting. In different embodiments, it is not necessary to detect if the accessory is connected to the electrical interface of the phone; it is possible to select the audio output units based on determining if the earphone is connected to the body of the user.

In other embodiments, it is not necessary to use the vibrator for alerting after determining that the audio output unit of the accessory is attached to the body of the user. It is also possible to use the vibrator alerting when an earphone is not attached to the ear, while no audio output unit of the accessory is selected.

Alerting signal may be provided not just for incoming calls but also for received messages, such as short message service (SMS), multimedia message service (MMS), or e-mail messages, as well as for events in a calendar. In such cases, application handling unit can be a message handling unit or a calendar handling unit. It is also possible, instead of using the application handling unit that handles events, to use any application that has an audio output, such as a music player application, digital television application or video player application.

The detector can be implemented in many ways. In the case of electromechanical detectors, all types of voltage levels can be detected. The resistors may be connected in another way in relation to the switch so that a divided down voltage level together with the feeding voltage may be used for detecting if the first earphone is attached to the ear or not. There could also be a switching between the feeding voltage and ground. The invention is in fact not at all limited to electromechanical detectors. It may for instance incorporate a light detector that detects the lighting conditions when the accessory is attached to the body of the user. Further, the detector may detect darkness when it is pressed against an ear when it is attached. The detector may be an IR detector that senses body heat, a pulse detector that senses user pulses, a detector for detecting the capacitance of the user or even a biometrics detector. The interfaces for the phone and the accessory need not be restricted to Support only cable or wire communication. The interfaces may be provided in the form of short range wireless communication units, for instance, Bluetooth™ communication units. Whether the accessory is connected to the portable electronic device is then detected through other communication units. The signal from the detector may also be transmitted.

Although the present invention has been described in connection with specific embodiments, it is not intended to be limited to the specific form set forth herein. Rather, the scope of the present invention is limited only by the accompanying claims.

The invention claimed is:

1. A method for driving an accessory for a portable electronic device, the method comprising:
   determining, with a first detector in a first audio output unit, if the first audio output unit of the accessory is attached to a body of a user;
   determining, with a second detector in a second audio output unit, if the second audio output unit of the accessory is attached to the body of the user;
   selecting the first audio output unit when it is determined that the first audio output unit is attached to the body;
   selecting the second audio output unit when it is determined that the second audio output unit is attached to the body;
   transmitting an audio output signal to the first audio output unit when the first audio output unit is selected; and
   transmitting the audio output signal to the second audio output unit when the second audio output unit is selected.

2. The method as in claim 1, where, when it is determined that one of the first or second audio output units is attached to the body, no audio output unit in the portable electronic device is selected.

3. The method as in claim 1, further comprising:
   receiving an occurrence of an event in the portable electronic device; and
   transmitting a signal to at least one of the first or second audio output units to provide an alert of the occurrence of the event.

4. The method as in claim 3, further comprising:
   choosing a vibrator included in the portable electronic device for signaling the occurrence of the event when it is determined that one of the first or second audio output units is attached to the body.

5. The method as in claim 3, where receiving the occurrence of the event includes receiving an incoming call.

6. The method as in claim 5, further comprising:
   automatically accepting the incoming call after a predetermined number of alerting intervals when it is determined that one of the first or second audio output units is attached to the body.

7. The method as in claim 1, further comprising:
   determining if the accessory is connected to the portable electronic device,
   where selecting the first audio output unit is further based on determining if the accessory is connected to the portable electronic device and selecting the second audio output unit is further based on determining if the accessory is connected to the portable electronic device.

8. The method as in claim 1, where the portable electronic device includes a device audio output unit and the device audio output unit is selected when the first and second audio output units are determined not to be attached to the body.

9. The method as in claim 8, where the device audio output unit is in the portable electronic device.

10. A portable electronic device comprising:
    an interface for connecting the portable electronic device to an accessory that includes a first audio output unit comprising a first audio component and a second audio component; and
    a control unit to:

determine if the first audio output unit is attached to the body of a user, where, when making the determination, the control unit is further to:
　　determine if the first audio component is attached to the body of the user, or
　　determine if the second audio component is attached to the body of the user,
select the first audio output unit of the accessory when either the first audio component or the second audio component is determined to be attached to the body of the user,
select a second audio output unit of the portable electronic device when the first audio output unit is determined not to be attached to the body of the user, and
transmit an audio output signal to the first audio output unit or the second audio output unit based on the selection, where, when transmitting the audio output signal to the first audio output unit, the control unit is further to:
　　send the audio output signal to the first audio component when the first audio component is determined to be attached to the body of the user, and
　　send the audio output signal to the second audio component when the second audio component is determined to be attached to the body of the user.

11. The portable electronic device as in claim 10, where, when it is determined that the first audio output unit is attached to the body, no audio output unit in the portable electronic device is selected.

12. The portable electronic device as in claim 10, where the control unit is further configured to:
receive an occurrence of an event in the portable electronic device; and
transmit a signal to the first audio output unit to provide an alert of the occurrence of the event.

13. The portable electronic device as in claim 12, further comprising a vibrator and where the control unit additionally chooses the vibrator for signaling the occurrence of the event when it is determined that the first audio output unit is attached to the body.

14. The portable electronic device as in claim 12, where of the event includes receipt of an incoming call.

15. The portable electronic device as in claim 14, where the control unit is further configured to:
automatically accept the call after a predetermined number of alerting intervals when it is determined that the first audio output is attached to the body.

16. The portable electronic device as in claim 10, where the control unit is further configured to:
determine if the accessory is connected to the portable electronic device,
where selecting the first audio output unit is further based on determining that the accessory is connected to the portable electronic device.

17. The portable electronic device as in claim 10, where the control unit selects the second audio output unit when the first audio output unit is not attached to the body.

18. The portable electronic device as in claim 10, where the portable electronic device includes a portable communication device.

19. The portable electronic device as in claim 10, where the portable electronic device includes a cellular phone.

20. A portable electronic device, comprising:
means for determining if a first component, of a first audio output unit in an accessory for the portable electronic device, is attached to a body of a user;
means for determining if a second component, of the first audio output unit in the accessory for the portable electronic device, is attached to the body of the user;
means for selecting the first audio output unit when it is determined that the first component or the second component, of the first audio output unit, is attached to the body of the user; and
means for transmitting an audio output signal to the first audio output unit when the first audio output unit is selected, where the means for transmitting the audio output signal further comprises:
　　means for transmitting the audio output signal to the first component when the first component is determined to be attached to the body of the user, and
　　means for transmitting the audio output signal to the second component when the second component is determined to be attached to the body of the user.

21. A computer program product including a machine executable instructions for performing a method, the method comprising:
determining, with a first detector in a first audio output unit of an accessory for a portable electronic device, if the first audio output unit is attached to a body of a user;
determining, with a second detector in a second audio output unit of the accessory, if the second audio output unit is attached to the body of the user;
selecting the first audio output unit when it is determined that the first audio output unit is attached to the body;
selecting the second audio output unit when it is determined that the second audio output unit is attached to the body;
transmitting an audio output signal to the to the first audio output unit when the first audio output unit is selected without transmitting the audio output signal to the second audio output unit when the second audio output unit is not selected.

22. A method comprising:
determining if individual components, of an audio output unit in an accessory for a portable electronic device, are attached to a body of a user;
transmitting a signal to the portable electronic device, based on determining that one of the individual components, of the audio output unit, is attached to the body;
selecting, by the portable electronic device, the audio output unit when the transmitted signal indicates that one of the individual components, of the audio output unit, is attached to the body; and
transmitting, by the portable electronic device, an audio output signal to the audio output unit, where the transmitting further includes selectively transmitting the audio output signal to only the one of the individual components that is determined to be attached to the body of the user.

23. The method as in claim 22, further comprising:
receiving the audio output signal and generating sound through the first audio output unit based on the audio output signal.

* * * * *